(12) United States Patent
Belmonte et al.

(10) Patent No.: US 9,726,039 B2
(45) Date of Patent: Aug. 8, 2017

(54) OIL TRANSFER SYSTEM ON ROTATING SHAFT

(71) Applicant: SNECMA, Paris (FR)

(72) Inventors: Olivier Belmonte, Perthes en Gatinais (FR); Serge Louis Antunes, Combs la Ville (FR); Mathieu Perrier, Manneville sur Risle (FR)

(73) Assignee: SNECMA, Paris (FR)

( * ) Notice: Subject to any disclaimer, the term of this patent is extended or adjusted under 35 U.S.C. 154(b) by 548 days.

(21) Appl. No.: 14/208,485

(22) Filed: Mar. 13, 2014

(65) Prior Publication Data

US 2014/0271151 A1 Sep. 18, 2014

(30) Foreign Application Priority Data

Mar. 14, 2013 (FR) ...................................... 13 52264

(51) Int. Cl.
*F01D 5/08* (2006.01)
*F01D 25/18* (2006.01)
(Continued)

(52) U.S. Cl.
CPC ............ *F01D 25/18* (2013.01); *B64C 11/308* (2013.01); *F02C 6/206* (2013.01); *F02C 7/06* (2013.01);
(Continued)

(58) Field of Classification Search
CPC .... F04D 29/063; F04D 29/128; F04D 29/061; F04D 29/584
(Continued)

(56) References Cited

U.S. PATENT DOCUMENTS

| 3,264,043 A | 8/1966 | Keen |
| 5,489,190 A | 2/1996 | Sullivan |
| 2011/0243735 A1* | 10/2011 | Balk ....................... B64C 11/48 |
| | | 416/129 |

FOREIGN PATENT DOCUMENTS

| CN | 201892017 U | 7/2011 |
| DE | 2543258 A1 | 3/1977 |

(Continued)

OTHER PUBLICATIONS

Search Report issued on Nov. 12, 2014 in the corresponding United Kingdom Application No. GB1404366.5.
(Continued)

*Primary Examiner* — Eric Keasel
*Assistant Examiner* — Jason Mikus
(74) *Attorney, Agent, or Firm* — Oblon, McClelland, Maier & Neustadt, L.L.P.

(57) ABSTRACT

A lubrication system for a device located between an internal shaft and an external shaft of an aircraft turbine, that are free to rotate, concentric and arranged at least partially one around the other, is provided. The lubrication system includes an annular element provided with an external groove and being mounted integral with the external shaft, the external groove being supplied with lubricant from a fixed part of the turbine; and a grooved element mounted integral with the internal shaft, the grooved element having a relief which directs a lubricant in contact with its external surface along a longitudinal direction when the internal shaft is rotating. The external groove is in fluid communication with an external surface of the grooved element through at least two conduits arranged through the external shaft.

9 Claims, 7 Drawing Sheets

(51) Int. Cl.
    *F02K 3/072*     (2006.01)
    *F02C 6/20*     (2006.01)
    *F02C 7/06*     (2006.01)
    *B64C 11/30*     (2006.01)
    *B64D 27/00*     (2006.01)

(52) U.S. Cl.
    CPC ........ *F02K 3/072* (2013.01); *B64D 2027/005* (2013.01); *F05B 2250/25* (2013.01); *Y02T 50/66* (2013.01)

(58) Field of Classification Search
    USPC .......................................................... 415/175
    See application file for complete search history.

(56) References Cited

FOREIGN PATENT DOCUMENTS

| | | |
|---|---|---|
| DE | 26 11 682 | 9/1977 |
| EP | 0 083 266 A1 | 7/1983 |
| EP | 1 193 372 A2 | 4/2002 |
| EP | 2 0830197 A2 | 7/2009 |
| GB | 2 405 450 A | 3/2005 |

OTHER PUBLICATIONS

French Preliminary Search Report issued Jan. 10, 2014, in Patent Application No. FR 1352264, filed Mar. 14, 2013 (with English Translation of Category of Cited Documents).
U.S. Appl. No. 14/414,343, filed Jan. 12, 2015, Belmonte, et al.
U.S. Appl. No. 14/361,954, filed May 30, 2014, Belmonte, et al.

\* cited by examiner

OIL TRANSFER SYSTEM ON ROTATING SHAFT

TECHNICAL FIELD AND PRIOR ART

This invention relates to the lubrication of mobile parts in aircraft turbines, particularly in the case of open rotor turbojets.

The general architecture of Open Rotor turbomachines is different from the architecture of conventional turbomachines by the special arrangement of the fan that comprises two counter-rotating elements, for example rotors, located outside the turbomachine fairing.

A distinction is made between two types of Open Rotor turbojets, namely Pusher Open Rotor and Puller Open Rotor.

In the case of the Pusher Open Rotor, the counter-rotating elements are located on the downstream side of the turbomachine, in other words behind the turbomachine along the direction of movement of the aircraft. These two rotors are guided in rotation by bearings supported on elements of the stator located at the engine centre line and that facilitate the routing of ancillaries and the oil supply to the bearings.

In the case of the Puller Open Rotor, the counter-rotating elements are located on the upstream side of the turbomachine, in other words in front of the turbomachine. This arrangement is specific in that there is no fixed part at the centre of the fans, which complicates the oil supply to the bearings, and particularly bearings located between the two rotating shafts.

The lack of a fixed part at the centre of the engine makes it necessary to be able to circulate lubricant from the external parts towards the internal parts, taking account of particular structural constraints. The position of the bearings makes it impossible to have a direct jet supply from the exterior. Unfavourable wall gradients that prevent oil from running towards the bearing also have to be taken into account.

The invention is aimed at disclosing a simple and efficient lubrication system for a bearing located between two rotating shafts.

PRESENTATION OF THE INVENTION

The invention thus relates to a lubrication system for a device located between an internal shaft and an external shaft of an aircraft turbine, the internal and external shafts being free to rotate, concentric and arranged at least partially one around the other, the system comprising:
  an annular element provided with an external groove, said annular element being configured so that it can be mounted integral with the external shaft, the external groove being designed to be supplied with lubricant from a fixed part of the turbine,
  a grooved element configured to be mounted integral with the internal shaft, the grooved element having relief designed to direct a lubricant in contact with its external surface along a given longitudinal direction when the internal shaft is rotating,
  the external groove of the annular element being in fluid communication with an external surface of the grooved element through at least two conduits arranged through the external shaft.

For the purposes of this description, an element is considered to be integral with a shaft if it is fixed on this shaft and follows the rotation movement.

With the invention, it is easy to supply lubricant to a device located between two concentric rotating shafts.

According to one advantageous characteristic, the grooved element comprises a helical groove on its external surface.

The helical groove formed on the grooved element thus optimally directs the lubricant to the device to be lubricated.

Advantageously, the lubrication system comprises an accumulation ring forming the lubricant reservoir that is configured to be mounted in the external shaft. Recesses are formed on the accumulation ring, for example on the outside, to have a continuously available reserve of lubricant including during transient phases, in other words during the turbomachine start up, deceleration and stop phases.

Also advantageously, a surface of the accumulation ring extends radially from an upstream side of the grooved element and is arranged to limit any projection of lubricant on this upstream side.

According to one advantageous characteristic, the lubrication system comprises at least two ducts that will be placed inside a corresponding conduit, each said duct being configured to extend from the external groove of the annular element to the external surface of the grooved element.

The presence of these ducts simply and reliably transfers lubricant through the different elements to the grooved element.

The lubrication system comprises a retaining ring and each duct has an outer collar that will be sandwiched between the retaining ring and the accumulation ring, to assure that the different elements are properly retained in the turbine.

The retaining ring advantageously acts as a shock absorber for the accumulation ring. The retaining ring also forces each duct into its position. The ducts also advantageously keep the accumulation ring and the retaining ring in their angular positions relative to the external shaft.

In one of the planned uses of the lubrication system, the device to be lubricated is a roller bearing or a ball bearing.

The invention also relates to an aircraft turbine comprising an internal shaft and an external shaft that are concentric and free to rotate, with one arranged at least partially around the other, and comprising a lubrication system like that disclosed above.

In one case within the scope of the invention, the internal shaft and the external shaft are free to move in rotation in opposite directions when the turbine is in operation.

BRIEF DESCRIPTION OF THE DRAWINGS

We will now describe different embodiments of the invention as non-limitative examples with reference to the appended drawings in which.

DETAILED PRESENTATION OF PARTICULAR EMBODIMENTS

Figure 1:
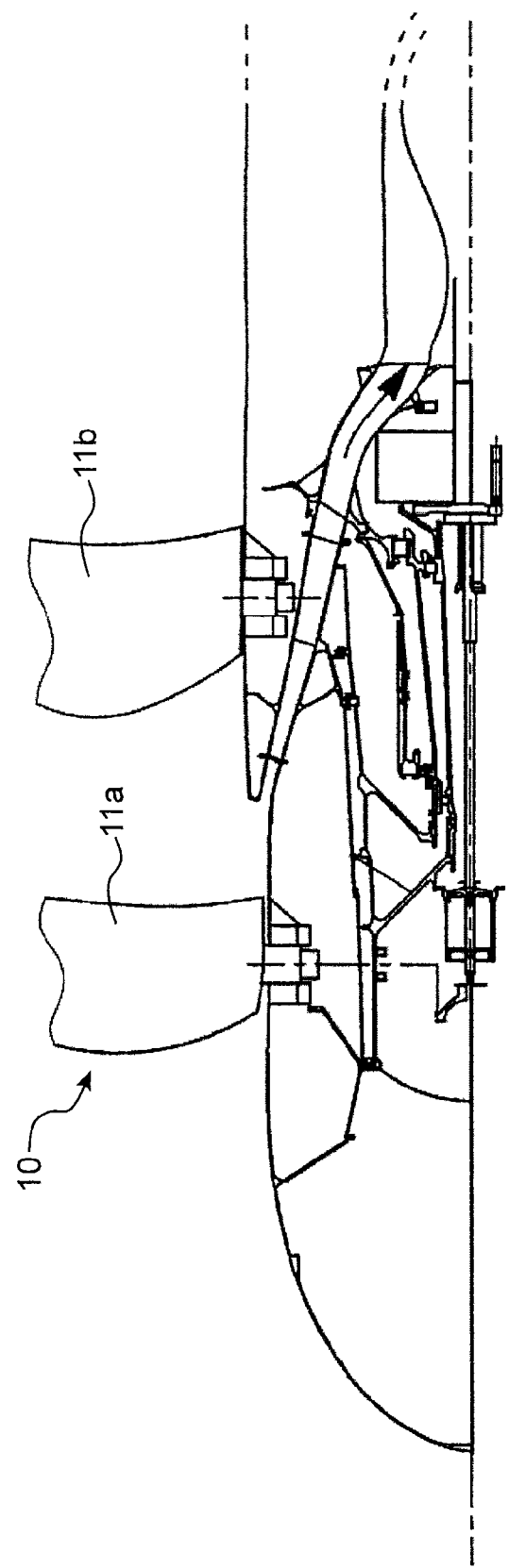
FIG. 1 is a sectional view of a Puller Open Rotor type turbomachine.

FIG. 1 shows a Puller Open Rotor type of fan 10. The fan 10 comprises upstream blades 11a and downstream blades 11b on its forward part, blades 11a being located in front of blades 11b. When the turbomachine is in operation, the blades 11a and 11b rotate in opposite directions.

Figure 2:
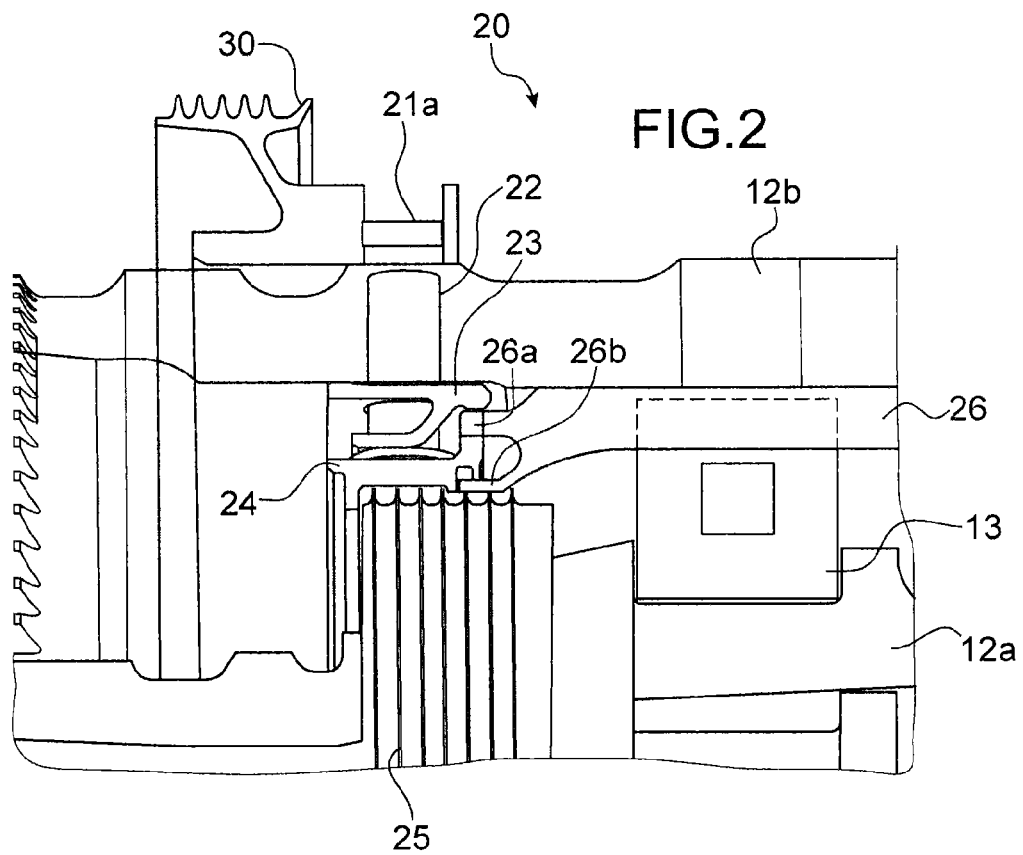
FIG. 2 is a sectional view of a lubrication system according to the invention.

These blades 11a and 11b of the fan 10 are controlled in rotation by an upstream fan shaft 12a and a counter-rotating downstream fan shaft 12b respectively, visible in FIG. 2. The downstream fan shaft 12b is arranged around the upstream fan shaft 12a.

A bearing 13, in this case a roller bearing, connects the two shafts 12a and 12b. This bearing 13 comprises an outer ring 26 (namely an external smooth ring).

A lubrication system 20 continuously supplies the bearing 13 with lubricant or oil.

In this case, this system 20 comprises a centripetal scoop 30, a plurality of supply ducts 22, a retaining ring 23, an accumulation ring 24 and a supply helix 25 (FIG. 2).

Figure 3:
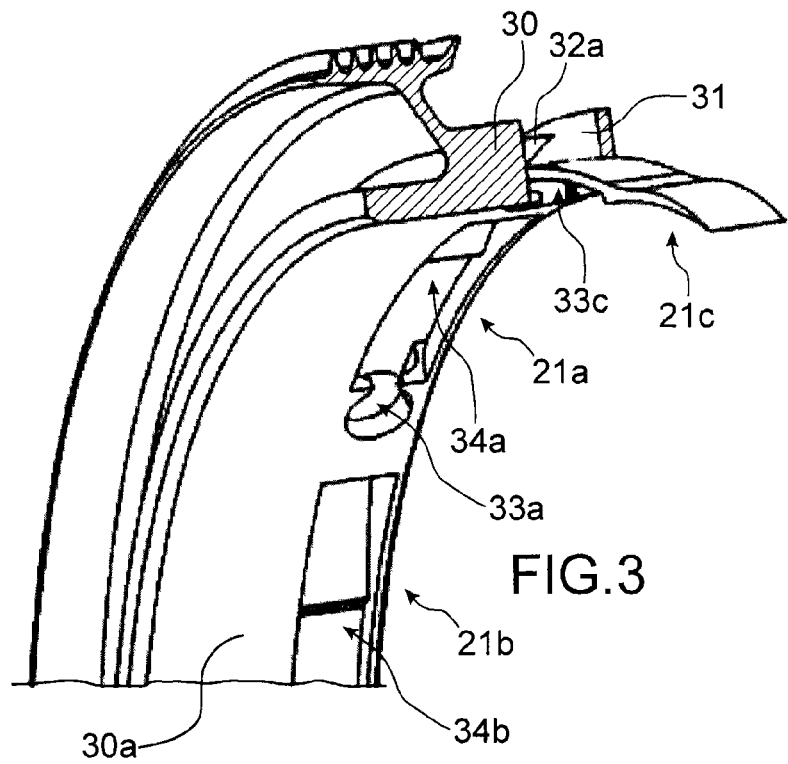
FIG. 3 is a sectional and perspective view of a centripetal scoop included in the lubrication system in FIG. 2.

The centripetal scoop 30 is an annular element comprising an annular groove 31 around its external periphery (FIG. 3). The scoop 30 also comprises a plurality of lubricant passages, in this case openings 21a to 21c shown in FIG. 3.

The opening 21a has a recess 34a and a duct housing 33a that are formed directly in the scoop 30. In the embodiment shown, the opening 21a also comprises a blade 32a.

The recess 34a is formed by a hollow made in the element 30. More precisely, the recess 34a extends around a portion of the internal periphery of the element 30. At a first end, the recess 34a passes through the element 30 to open up in the groove 31. At an end opposite the first end, the recess 34a opens up in the duct housing 33a.

The duct housing 33a is a reaming in this case with a circular section formed from the inside face 30a of the scoop 30 and through only part of its thickness.

The blade 32a is arranged through the scoop 30, a first end of the blade 32a being arranged to project in the groove 31, its other end being directed towards the inside of the recess 34a.

The orientation of the blade 32a is designed to facilitate the transfer of lubricant from the groove 31 towards the duct housing 33a through the recess 34a when the shaft 12b is rotating.

The scoop 30 is designed to be mounted on the shaft 12b such that the internal face 30a of the scoop 30 comes into contact with the external surface 15 of the shaft 12b, closing off the open side of the recess 34a.

Other similar openings are formed around the periphery of the scoop 30 to achieve an optimum flow distribution, for example openings 21b and 21c shown partially in FIG. 3. In addition to the opening 21a, FIG. 3 shows the recess 34b of the opening 21b and the duct housing 33c of the opening 21c.

Each duct housing 33a of the scoop 30 houses a corresponding supply duct 22. The number of ducts depends on the constraints in each structure.

Figure 4:
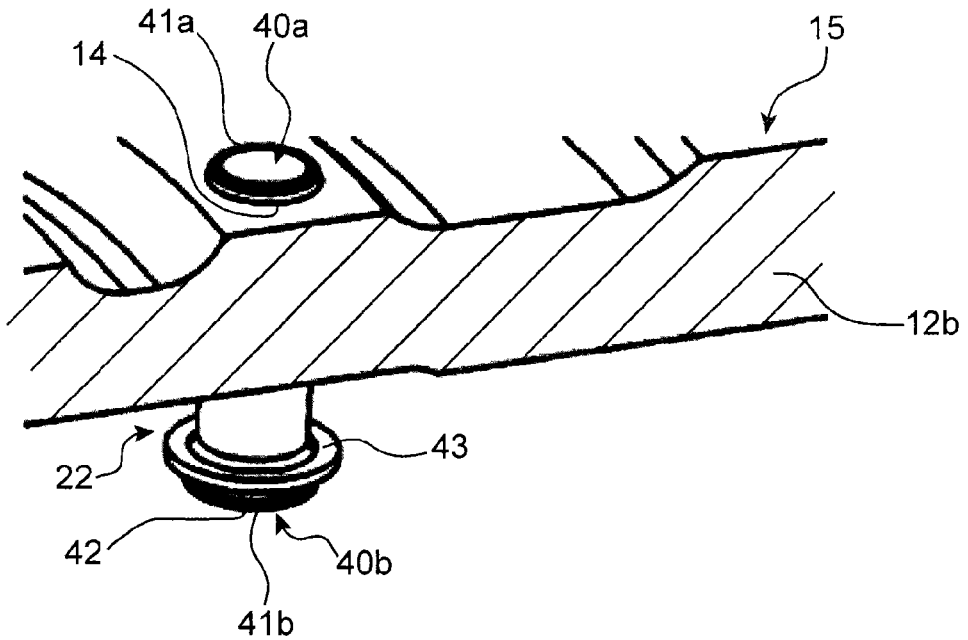
FIG. 4 is a sectional and perspective view of a downstream fan shaft supporting a supply duct included in the lubrication system.

Such a duct 22 is shown in detail in FIG. 4. This duct 22 has an orifice 40a at its first end 41a, and an orifice 40b at an opposite end 41b. The duct 22 has an external end groove 42 starting at its end 41b followed by a locking collar 43.

The groove 42 is annular and is designed to house an O-ring (not shown).

The locking collar 43 is also annular. Its role will be described later.

In FIG. 4, the duct 22 is inserted in a reaming 14 of the shaft 12b through its end 41a. The end 41a projects slightly from the surface 15 so that it can be located in the duct housing 33a. At least one other duct 22 is inserted in another similar or identical reaming 14. In general, reamings and ducts are arranged regularly through the shaft 12b to achieve good balance of rotating masses.

Figure 5A:
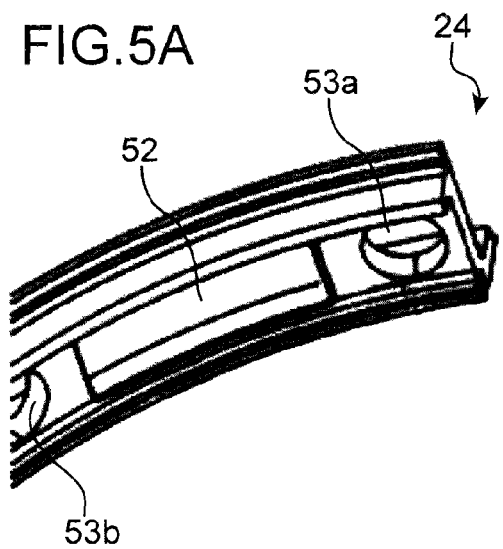
FIGS. 5A and 5B are firstly a sectional and perspective view of the inside, and secondly a sectional view of an oil accumulation ring included in the lubrication system.
Figure 5B:
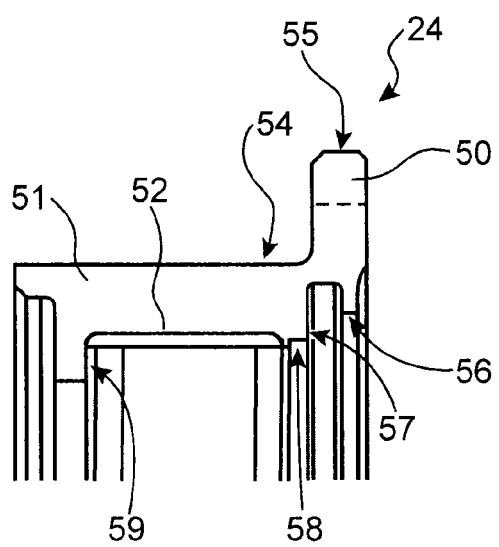
Figure 7:
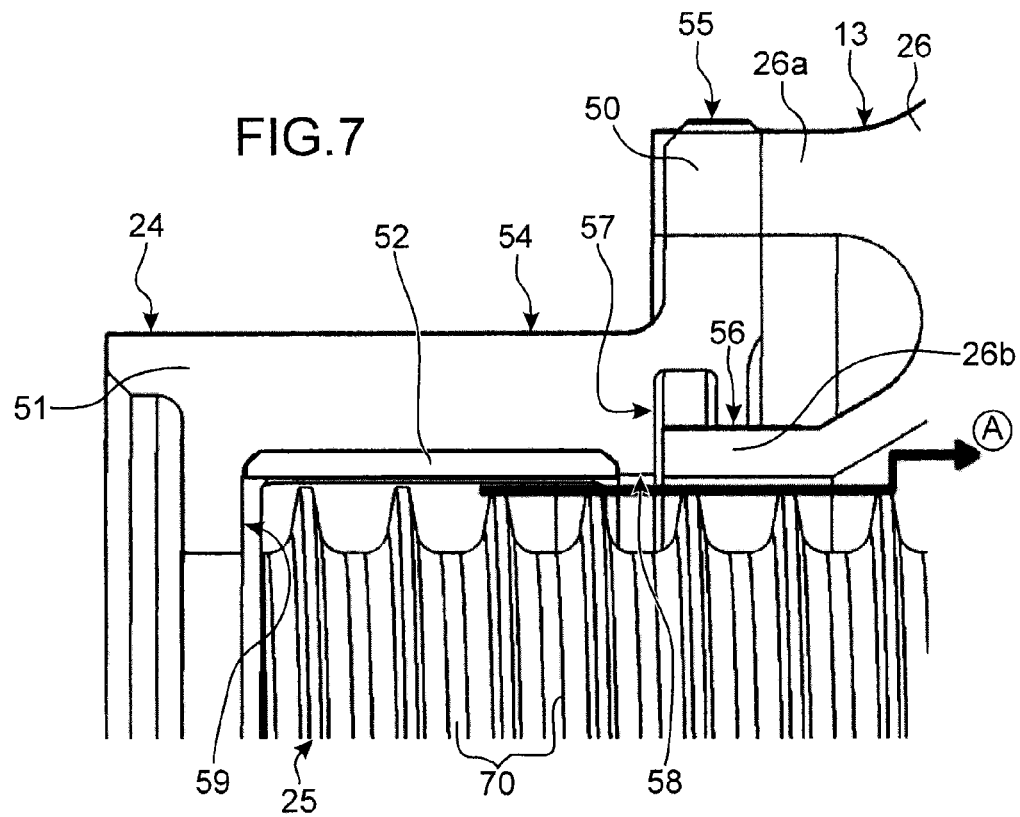
FIG. 7 is a detail of FIG. 2 showing the circulation of the lubricant between the oil accumulation ring and a supply helix included in the lubrication system.

The oil accumulation ring 24 is shown in detail in FIGS. 5A, 5B and 7.

The ring 24 is an annular element with an L-section. Two main sections 50 and 51 are thus arranged transverse to each other.

The first wall 50 extends radially outwards. This wall 50 is notched so that it will engage with a corresponding edge 26a on the outer ring 26 of the bearing 13.

The wall 51 is arranged transverse from an inside end of the wall 50.

The wall 51 has duct housings, for example 53a and 53b, and oil accumulation recesses 52.

In this case the duct housings 53a, 53b are reamings with a circular cross-section with the same inside diameter as the housings 33a and 33c. The number and distribution of the housings correspond to the arrangement of openings 21a, 21b and 21c on the scoop 30.

The recesses 52 are arranged crosswise on the internal part of the wall 51. The accumulation recesses 52 are inserted between the duct housings 53a, 53b around the periphery of the ring 24.

Several cylindrical surfaces 54 to 56 and 58 or annular surfaces 57 and 59 act as a stop or contact point with adjacent elements. A cylindrical surface means a surface with a longitudinal orientation, while an annular surface means a surface with a radial orientation.

The surface 54 acts as bearing for the collar 43.

The surface 55 will come into bearing contact with the surfaces 66 of the retaining ring 23 that will be described later.

Surfaces 56 and 57 act as stops in the radial and longitudinal directions at a lower edge 26b of the outer ring 26.

Finally, surfaces 58 and 59 surround the supply helix 25.

Figure 6:
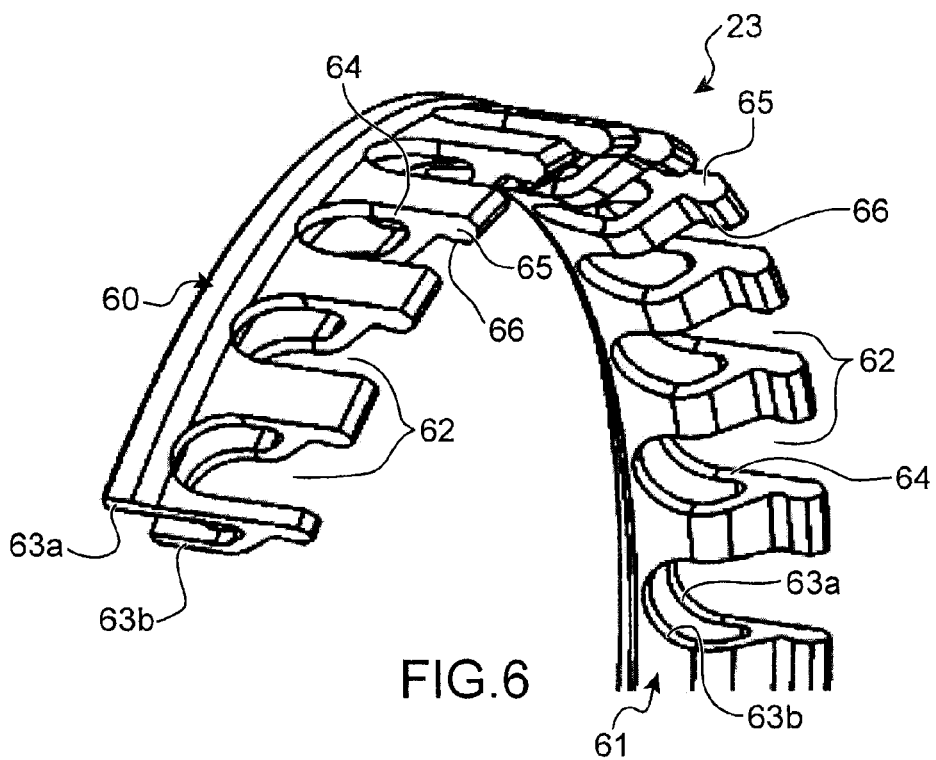
FIG. 6 is a sectional and perspective view of a retaining ring included in the lubrication system.

The retaining ring 23 (FIG. 6) is an annular element. The ring 23 comprises two annular sections 63a and 63b parallel to each other and connected through a plurality of junction portions 64.

The sections 63a and 63b have an external contact surface 60 and a first internal contact surface 61 respectively.

The portions 64 have elastic properties and provide a radial shock absorbing capacity to the ring 23.

An extension portion 65 is formed in continuity with each junction portion 64. The portions 65 have second internal contact surfaces 66 arranged jointly as a cylinder with a circular section.

A plurality of bays 62 is formed around the periphery of the ring 23 between the junction portions 64, with sections 63a and 63b defining the bottom of the bays. Each bay 62 will hold one duct 22 by lateral insertion. In the embodiment shown, the number of bays 62 is larger than the number of ducts 22 (for example see FIG. 12). A large number of bays increases the shock absorbing capacity of the ring 23.

As a variant not shown, the system 20 has one bay 62 for each duct 22.

Note that the elements described above, namely the annular element 30, the ducts 22, the retaining ring 23 and the accumulation ring 24 will be mounted fixed to the downstream fan shaft 12b, in other words they will be driven in rotation by the shaft 12b. On the other hand, the supply helix 25 described below will be mounted fixed to the upstream fan shaft 12a.

The supply helix 25 that can be seen in FIGS. 2 and 7 is a tubular element with a helical groove 70 around its external surface. The groove 70 will trap the lubricant and enable flow from the accumulation recesses 52, or more generally at the accumulation ring 24. The flow takes place along the longitudinal forward-aft direction A (see FIG. 7). The orientation of the groove 70 thus directs lubricant towards the bearing side 13 and prevents it from overflowing forwards.

We will now describe steps for assembling the elements of the lubrication system 20 on fan shafts 12a and 12b with reference to FIGS. 8 to 13.

Figure 8:
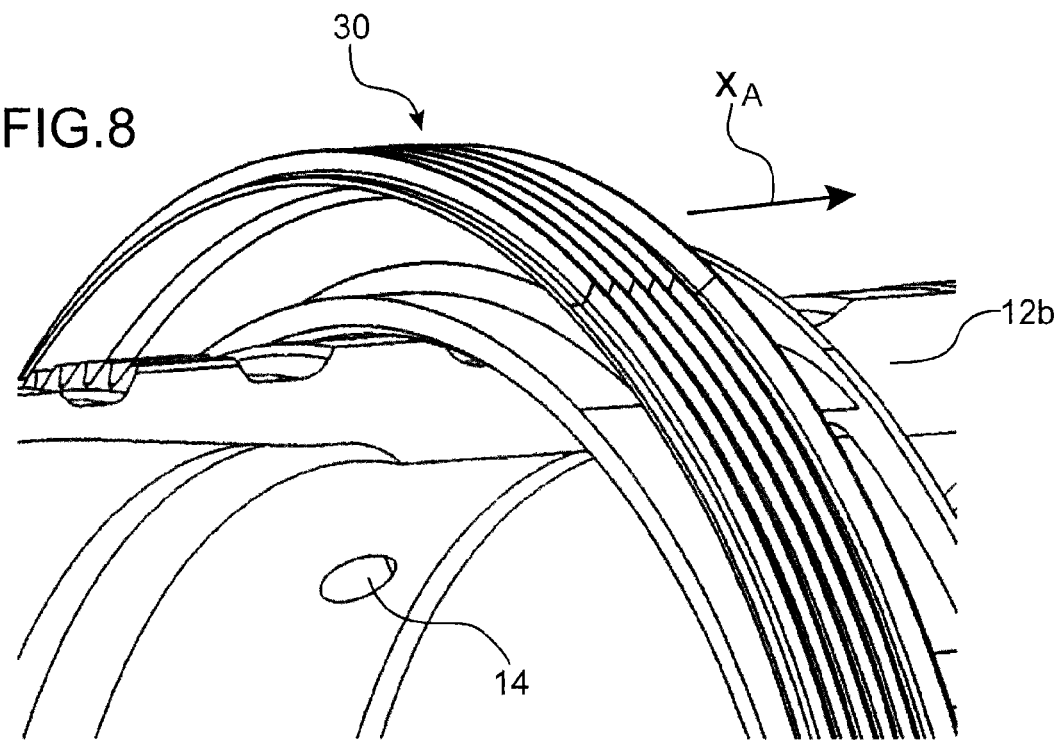
FIG. 8 is a perspective view of a first step in assembly of the lubrication system on the fan shafts, showing the downstream fan shaft and the centripetal scoop.

The annular element 30 comprising the centripetal scoops 21 is arranged around the downstream shaft 12b along a forward-aft insertion direction xA (FIG. 8). Each duct housing 33a is placed facing a reaming 14 in the shaft 12b.

Figure 9:
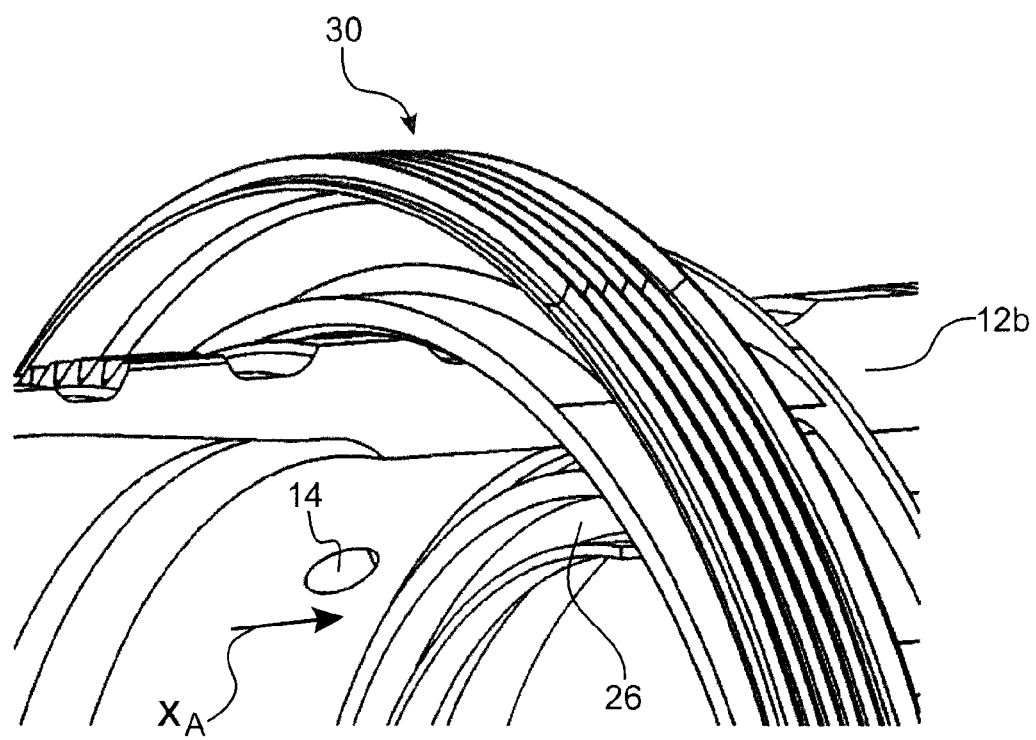
FIG. 9 is a view similar to FIG. 8 after placement of an outer ring of the bearing to be lubricated.
Figure 10:
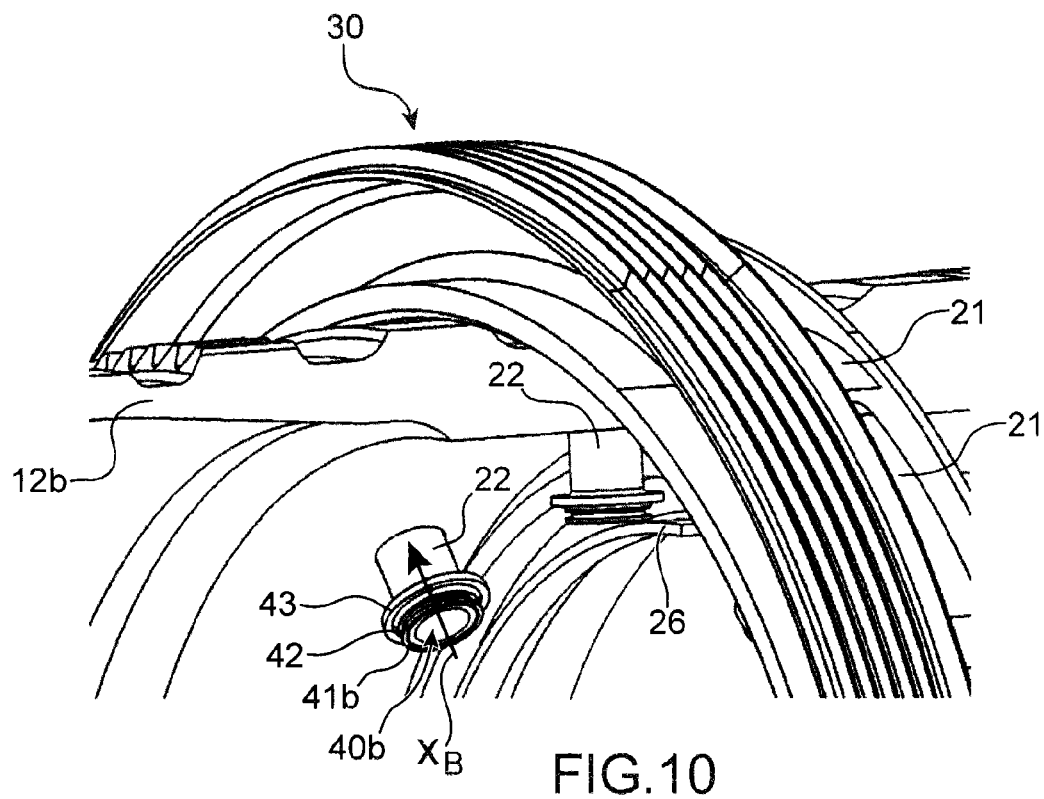
FIG. 10 is a view similar to FIG. 9 after placement of two supply ducts.

The smooth ring 26 of the bearing 13 is then put into position in the shaft 12b along the insertion direction xA, on the downstream side (in other words the aft side) of the radial reamings 14 (FIG. 9).

The ducts 22 are introduced radially in the reamings 14, in this case along the direction of the arrow xB (FIG. 10), the end 41a of the ducts 22 fitting into the housings 33a. The ducts 22 are engaged deeper in the reamings 14 than in their service position so as to leave sufficient space for assembly of the ring 24. An O-ring, not shown, is placed in the groove 42 in each duct 22.

The oil accumulation ring 24 is then put into place along the xA direction.

Figure 11:
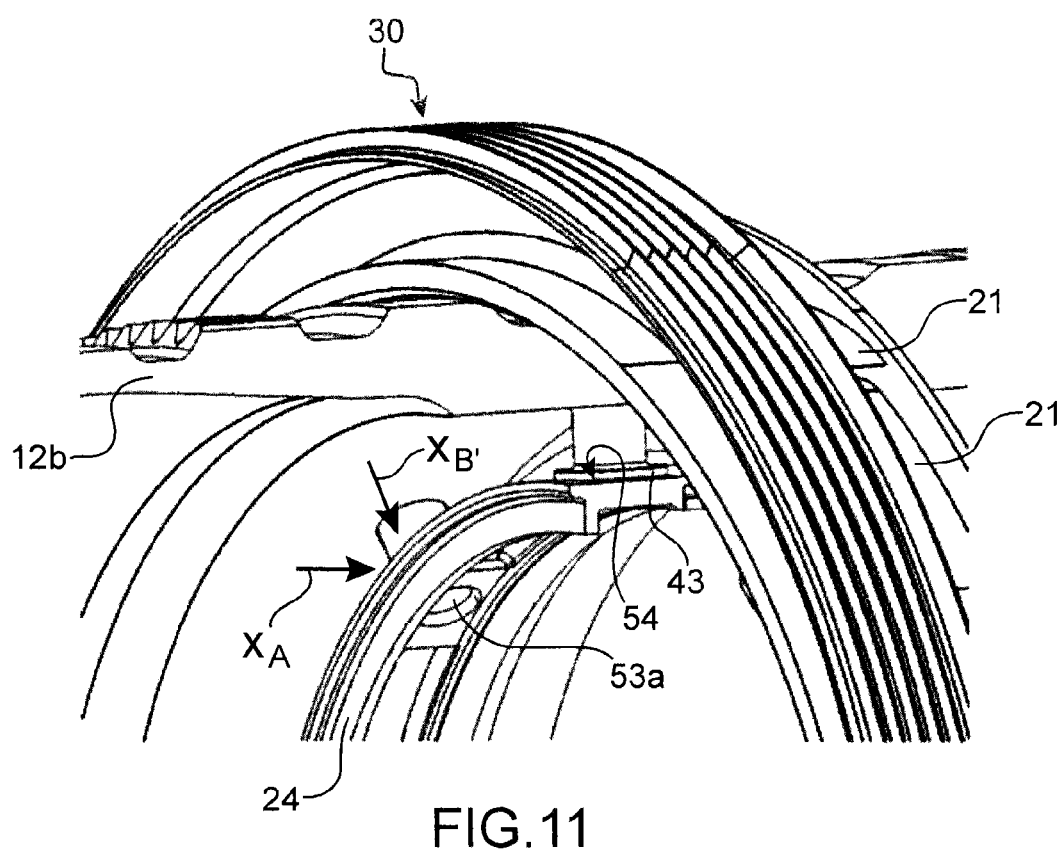
FIG. 11 is a view similar to FIG. 10 after placement of the oil accumulation ring.

The ends 41b of the ducts 22 are then inserted into the housings 53a in a direction xB' opposite xB. The collars 43 are put into place in contact with the surface 54 (FIG. 11).

Figure 12:
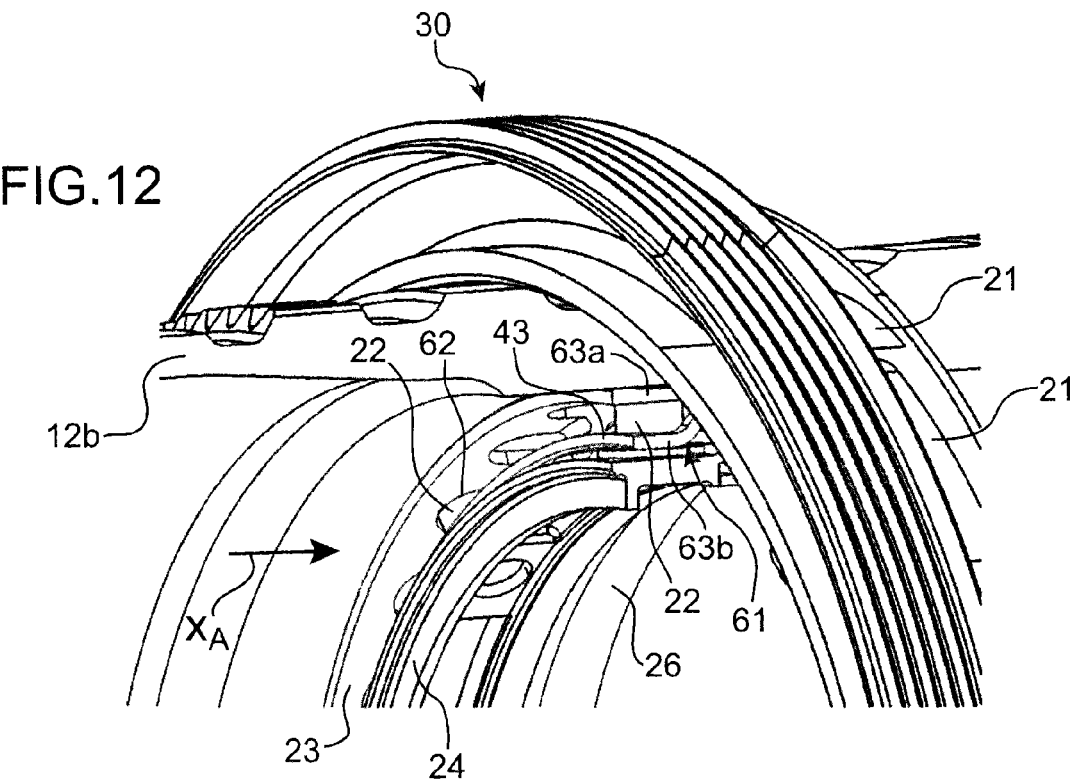
FIG. 12 is a view similar to FIG. 11 after placement of the retaining ring; and, FIG. 13 is a view similar to FIG. 12 after placement of an upstream fan shaft fitted with the supply helix.

The retaining ring 23 is inserted along the xA direction between the shaft 12b and the oil accumulation ring 24 (FIG. 12). Each duct 22 is housed in a bay 62. The inside surface 61 of the ring 23 comes into contact with the collars 43. Once the ring 23 is in position, the ducts 22 are blocked in the radial direction, the collars 43 being trapped between the surface 61 and the surface 54. Similarly, the rings 23 and 24 are blocked in rotation relative to shaft 12b.

Figure 13:
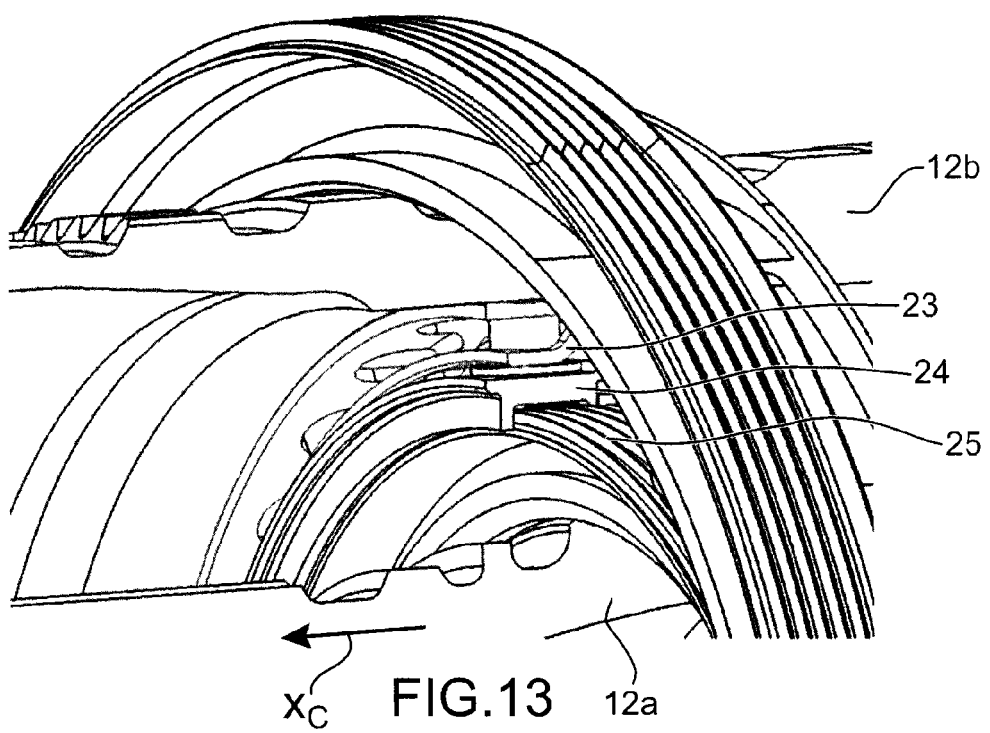

Finally, each upstream shaft 12a fitted with the supply helix 25 is inserted into the downstream shaft 12b fitted with the other elements of the system 20 along a direction of insertion xC opposite direction xA (FIG. 13). The supply helix 25 then comes into contact with the surfaces 58 and 59.

When the shafts 12a and 12b are rotating, lubricant circulates in the lubrication system 20 from the external parts towards the internal parts and in the forward to aft direction (from upstream to downstream).

Thus, the groove 31 is filled with lubricant from a fixed part of the turbomachine, for example by means of a pump not shown.

Rotation of the shaft 12b forces lubricant to circulate in the centripetal scoops 21a to 21c towards the recesses 34a and then the ducts 22.

The lubricant then accumulates between the ring 24 and the supply helix 25, in the recesses 52 forming a reservoir and in the helical groove 70. The helical groove 70 then directs lubricant to the bearing 13, the surface 59 of the accumulation ring 24 acting particularly to prevent lubricant from overflowing on the side opposite the bearing 13.

Advantageously, the presence of recesses 52 provides a reserve of lubricant that is always available, including during transient phases, in other words during turbomachine start, deceleration and stopping phases.

In general, the invention relates to lubrication of elements located between two rotating shafts present in an aircraft turbine. The roller bearing 13 may be replaced by any other type of bearing such as a ball bearing. Other applications are possible without going outside the scope of the invention.

The invention claimed is:

1. A lubrication system for a bearing located between and connecting an internal shaft and an external shaft of an aircraft turbine, said internal shaft and external shaft being free to rotate, concentric and arranged with the external shaft at least partially around the internal shaft, the lubrication system comprising: an annular element provided with an external groove, said annular element being configured so that said annular element can be mounted integral with said external shaft, said external groove being designed to be supplied with lubricant from a fixed part of the turbine; and a grooved element configured to be mounted integral with said internal shaft, said grooved element having a helical groove around an external surface of said grooved element designed to direct a lubricant in contact with the external surface of said grooved element along a given longitudinal direction toward the bearing due to an orientation of the helical groove when said internal shaft is rotating, wherein said external groove of said annular element is in fluid communication with said external surface of said grooved element through at least two conduits arranged through said external shaft, wherein said annular element comprises an opening in fluid communication with said external groove, said opening including a recess extending around a portion of an inner periphery of said annular element, a first end of said recess passing through said annular element so as to open up in said external groove, wherein a second end of said recess opens up in a duct housing formed on said annular element.

2. The lubrication system according to claim 1, further comprising an accumulation ring forming a lubricant reservoir, configured to be mounted in said external shaft.

3. The lubrication system according to claim 2, wherein a surface of said accumulation ring extends radially from an upstream side of said grooved element and is arranged to limit any projection of lubricant on said upstream side of said grooved element.

4. The lubrication system according to claim 2, further comprising a retaining ring, each duct having an outer collar designed to be sandwiched between said retaining ring and said accumulation ring.

5. The lubrication system according to claim 1, further comprising at least two ducts, placed inside a corresponding conduit, each duct being configured to extend from said external groove of said annular element to said external surface of said grooved element.

6. The lubrication system according to claim 1, wherein the bearing is a roller bearing or a ball bearing.

7. An aircraft turbine comprising:
  an internal shaft and an external shaft that are free to rotate, concentric and arranged with the external shaft at least partially around the internal shaft; and
  a lubrication system according to claim 1.

8. The aircraft turbine according to claim 7, wherein said internal shaft and said external shaft rotate in opposite directions when the aircraft turbine is in operation.

9. The lubrication system according to claim 1, wherein said opening includes a blade arranged through said annular element, a first end of said blade being arranged to project in said external groove and a second end of said blade being directed towards an inside of said recess.

* * * * *